US012709055B2

(12) United States Patent
Naito

(10) Patent No.: US 12,709,055 B2
(45) Date of Patent: Aug. 18, 2026

(54) FABRICATION METHOD AND FABRICATION APPARATUS

(71) Applicant: Hiroyuki Naito, Tokyo (JP)

(72) Inventor: Hiroyuki Naito, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 274 days.

(21) Appl. No.: 18/580,175

(22) PCT Filed: Jul. 19, 2022

(86) PCT No.: PCT/IB2022/056609
§ 371 (c)(1),
(2) Date: Jan. 18, 2024

(87) PCT Pub. No.: WO2023/007305
PCT Pub. Date: Feb. 2, 2023

(65) Prior Publication Data

US 2024/0326320 A1 Oct. 3, 2024

(30) Foreign Application Priority Data

Jul. 28, 2021 (JP) ................................ 2021-123291

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B33Y 10/00* (2014.12);
(Continued)

(58) Field of Classification Search
CPC ... B29C 64/112; B29C 64/209; B29C 64/236; B29C 64/291; B29C 64/393;
(Continued)

(56) References Cited

U.S. PATENT DOCUMENTS

2002/0167101 A1 11/2002 Tochimoto et al.
2002/0186274 A1* 12/2002 Kanda .................... B41J 2/2132 347/41
(Continued)

FOREIGN PATENT DOCUMENTS

JP 2000-280354 A 10/2000
JP 2015-221515 A 12/2015
(Continued)

OTHER PUBLICATIONS

Office Action issued Aug. 8, 2025 in Japanese Patent Application No. 2021-123291, 8 pages.
(Continued)

*Primary Examiner* — Galen H Hauth
*Assistant Examiner* — Mohamed K Ahmed Ali
(74) *Attorney, Agent, or Firm* — XSENSUS LLP

(57) ABSTRACT

A fabrication method includes discharging a colored ink that is active energy ray curable by an inkjet method to make a droplet (D1) of the colored ink land in a first landing region, irradiating the colored ink with active energy rays to cure the colored ink, discharging a base ink that is active energy ray curable by the inkjet method to make a droplet (D2) of the base ink land in a second landing region larger than the first landing region, and irradiating the base ink with the active energy rays to cure the base ink. The fabrication method further includes repeating the discharging the colored ink and the irradiating the colored ink, and repeating the discharging the base ink and the irradiating the base ink, to laminate multiple layers of the colored ink and the base ink to fabricate a colored three-dimensional object.

19 Claims, 2 Drawing Sheets

(51) Int. Cl.

| | |
|---|---|
| ***B33Y 10/00*** | (2015.01) |
| ***B33Y 30/00*** | (2015.01) |
| ***B41J 2/045*** | (2006.01) |
| ***B41J 2/21*** | (2006.01) |
| ***B41J 3/407*** | (2006.01) |
| *B29K 105/00* | (2006.01) |
| *B41M 5/00* | (2006.01) |

(52) U.S. Cl.

CPC ........... *B33Y 30/00* (2014.12); *B41J 2/04586* (2013.01); *B41J 2/21* (2013.01); *B41J 2/2114* (2013.01); *B41J 3/4073* (2013.01); *B29K 2105/0032* (2013.01); *B29K 2995/0021* (2013.01); *B41J 2/211* (2013.01); *B41J 2/2117* (2013.01); *B41M 5/0088* (2013.01)

(58) Field of Classification Search

CPC ........ B41J 2/04586; B41J 2/21; B41J 2/2114; B41J 3/4073; B41J 2/211; B41J 2/2117; B41M 5/0088

See application file for complete search history.

(56) References Cited

U.S. PATENT DOCUMENTS

| | | | | |
|---|---|---|---|---|
| 2008/0105160 | A1* | 5/2008 | Doi | C09D 11/322 347/100 |
| 2016/0193858 | A1 | 7/2016 | Tsuchiya | |
| 2016/0279972 | A1* | 9/2016 | Seki | B41J 2/21 |
| 2016/0361929 | A1 | 12/2016 | Weijkamp et al. | |
| 2018/0043680 | A1* | 2/2018 | Ochi | B29C 64/194 |
| 2018/0056581 | A1 | 3/2018 | Ochi | |
| 2018/0111323 | A1 | 4/2018 | Harayama | |
| 2019/0144692 | A1 | 5/2019 | Naito et al. | |
| 2019/0286103 | A1 | 9/2019 | Haida | |
| 2020/0016821 | A1 | 1/2020 | Ohnishi | |
| 2021/0155814 | A1* | 5/2021 | Kobayashi | C08F 220/58 |
| 2022/0306880 | A1 | 9/2022 | Shingai et al. | |
| 2023/0158810 | A1* | 5/2023 | Ishihara | B41J 2/2114 347/15 |

FOREIGN PATENT DOCUMENTS

| | | | |
|---|---|---|---|
| JP | 2016-128254 | A | 7/2016 |
| JP | 2018-030332 | A | 3/2018 |
| JP | 2018-065352 | A | 4/2018 |
| JP | 2018-070731 | A | 5/2018 |
| JP | 2019-162865 | A | 9/2019 |
| JP | 2020-015299 | A | 1/2020 |
| JP | 2021-147581 | A | 9/2021 |
| JP | 2022-147319 | A | 10/2022 |

OTHER PUBLICATIONS

International Search Report and Written Opinion issued on Oct. 11, 2022 in PCT/IB2022/056609 filed on Jul. 19, 2022, 8 pages.

Office Action issued Jan. 7, 2025 in Japanese Patent Application No. 2021-123291, 8 pages.

* cited by examiner

COMPARATIVE EXAMPLE

COMPARATIVE EXAMPLE

FABRICATION METHOD AND FABRICATION APPARATUS

CROSS-REFERENCE TO RELATED APPLICATIONS

This patent application is based on PCT filing PCT/IB2022/056609, filed Jul. 19, 2022, which claims priority from Japanese Patent Application No. 2021-123291, filed Jul. 28, 2021, the entire disclosure of each is hereby incorporated by reference herein.

TECHNICAL FIELD

Embodiments of the present disclosure relate to a fabrication method and a fabrication apparatus.

BACKGROUND ART

Additive manufacturing (AM) is known as one technology for fabricating a three-dimensional object. In the AM technology, a model of the three-dimensional object to be fabricated is sliced into thin layer models, the cross-sectional shape of each layer model is calculated, and layers of a fabrication material are laminated based on the calculated shapes of the thin layer models, thereby fabricating the three-dimensional object. In recent years, in the AM technology, a material jetting has attracted attention, in which an active energy ray curable composition is arranged at a desired position with an inkjet head, and the active energy ray curable composition is cured with a light irradiation device to fabricate a three-dimensional object.

The material jetting is mainly used for prototype manufacturing, and cured products preferably have various properties such as good stretchability, high impact resistance and high heat resistance. To improve these properties, a solid component such as a filler is added to the active energy ray curable composition.

To fabricate a colored cured product, a colorant such as a dye or a pigment is added to the active energy ray curable composition.

PTL 1 discloses a three-dimensional fabrication apparatus including a fabrication unit that forms a decorative layer to fabricate a three-dimensional object. In the decorative layer, layers including regions formed of colored ink or clear ink are laminated. The decorative layer includes an overlapping region and a non-overlapping region other than the overlapping region. In the overlapping region, adjacent layers formed of the same ink overlap each other. In the non-overlapping region, adjacent layers formed of the same ink do not overlap each other. The ink is discharged with a smaller discharge volume per unit volume in the overlapping region than in the non-overlapping region. When colored decorative portions, which are formed in upper and lower layers adjacent to each other in a direction of lamination, overlap each other, an overlapping portion of the colored decorative portions may be visually darker than a desired color tone, that is, a darker color occurs in the overlapping portion. When the colored decorative portions formed in the upper and lower layers are separated from each other, a boundary between the colored decorative portion of the upper layer and the colored decorative portion of the lower layer looks colorless, that is, a color omission occurs in the boundary. The three-dimensional fabrication apparatus disclosed in PTL 1 fabricates a three-dimensional object without defects in color tone, such as the darker color, the color omission, and the like, in a colored region of the three-dimensional object.

CITATION LIST

Patent Literature

[PTL 1]
Japanese Patent No. 6389061
[PTL 2]
Japanese Unexamined Patent Application Publication No. 2018-070731

SUMMARY OF INVENTION

Technical Problem

However, when such a three-dimensional fabrication apparatus discharges the active energy ray curable ink by the inkjet method to fabricate a colored three-dimensional object, printing accuracy in the colored region of the three-dimensional object may be reduced.

Solution to Problem

To solve the above-described situation, a fabrication method includes discharging a colored ink that is active energy ray curable by an inkjet method to make a droplet of the colored ink land in a first landing region, irradiating the colored ink with active energy rays to cure the colored ink, discharging a base ink that is active energy ray curable by the inkjet method to make a droplet of the base ink land in a second landing region larger than the first landing region, and irradiating the base ink with the active energy rays to cure the base ink. The fabrication method further includes repeating the discharging the colored ink and the irradiating the colored ink, and repeating the discharging the base ink and the irradiating the base ink, to laminate multiple layers of the colored ink and the base ink to fabricate a colored three-dimensional object.

According to other embodiments of the present disclosure, there is provided a fabrication apparatus that includes a first discharge device to discharge a colored ink that is active energy ray curable by an inkjet method to make a droplet of the colored ink land in a first landing region, a first cure device to irradiate the colored ink with active energy rays to cure the colored ink, a second discharge device configured to discharge a base ink that is active energy ray curable by the inkjet method to make a droplet of the base ink land in a second landing region larger than the first landing region, and a second cure device to irradiate the base ink with the active energy rays to cure the base ink. The first discharge device and the first cure device repeatedly discharge and cure the colored ink, and the second discharge device and the second cure device repeatedly discharge and cure the base ink, to laminate multiple layers of the colored ink and the base ink to fabricate a colored three-dimensional object.

Advantageous Effects of Invention

According to the present disclosure, a fabrication method and a fabrication apparatus can be provided to fabricate a colored three-dimensional object with good printing accuracy in the colored region by the inkjet method of discharging the active energy ray curable ink.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
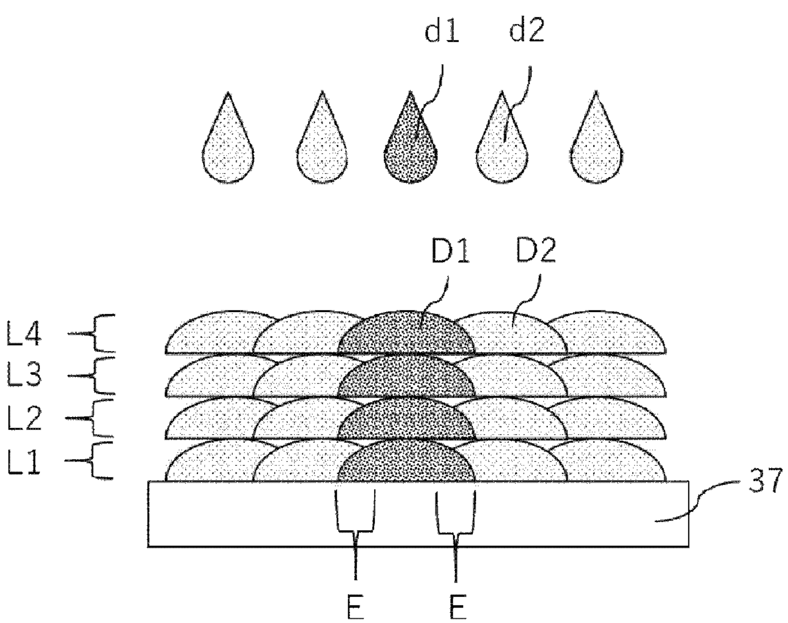
FIG. 1 is a schematic diagram illustrating a fabrication method of fabricating a colored three-dimensional object according to a comparative method.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Fabrication Method

A fabrication method according to an embodiment of the present disclosure includes a discharge step C of discharging a colored ink that is active energy ray curable by an inkjet method, a cure step C of irradiating the colored ink with active energy rays to cure the colored ink, a discharge step B of discharging a base ink that is active energy ray curable by the inkjet method, and a cure step B of irradiating the base ink with the active energy rays to cure the base ink. The fabrication method according to the present embodiment may include other steps if desired. For example, the fabrication method further includes a discharge step S of discharging a support ink that is active energy ray curable by the inkjet method, and a cure step S of irradiating the support ink with the active energy rays to cure the support ink. The colored ink discharged in the discharge step C is landed in a landing region C (an example of a first landing region), the base ink discharged in the discharge step B is landed in a landing region B (an example of a second landing region), and the support ink discharged in the discharge step S is landed in a landing region S.

In the fabrication method according to the present embodiment, the discharge step C and the cure step C are sequentially repeated, and the discharge step B and the cure step B are sequentially repeated. As a result, multiple layers of the colored ink and the base ink are laminated to fabricate a colored three-dimensional object. The sequential repetition of the discharge step C and the cure step C (hereinafter also referred to as "repeated steps C") and the sequential repetition of the discharge step B and the cure step B (hereinafter also referred to as "repeated steps B") may be performed independently. Alternatively, some steps of the repeated steps C and the repeated steps B (for example, the cure step C and the cure step B) may be performed simultaneously.

In the present disclosure, the term "active energy ray curable" refers to a property of forming a cured product by being irradiated with active energy rays. Further, the term "being cured" indicates that a polymer is formed, but is not limited to "being solidified", and includes "being thickened" and "being simultaneously solidified and thickened." The "cured product" represents a polymer, but is not limited to a solid, and includes a thickened product, a mixture of a solid and a thickened product, and the like.

In the present disclosure, the "active energy ray curable base ink" refers to ink that forms a shape of a desired three-dimensional object (hereinafter also referred to as a "model portion") by being cured. The "active energy ray curable colored ink" refers to ink that forms a colored region, by being cured, exhibiting a color different from the color of the region formed of the cured base ink in the model portion. The "active energy ray curable support ink" refers to ink that forms a shape of a support portion that supports the model portion by being cured.

In the present disclosure, the above-described "landing region C" refers to a region in which the colored ink discharged for one voxel is landed. The "landing region B" refers to a region in which the base ink discharged for one voxel is landed. The "landing region S" refers to a region in which the support ink discharged for one voxel is landed.

In the present disclosure, the above-described "layer" refers to a region where a plurality of landing regions C and a plurality of landing regions B located at substantially the same height are aggregated. For example, the layer is an aggregation region of the plurality of landing regions C and the plurality of landing regions B that are formed between a predetermined operation at a predetermined position and the predetermined operation at a next predetermined position. The predetermined operation is, for example, formation of the landing regions C, a flattening step (e.g., roller processing) described below, or the like. The next predetermined position is different from the predetermined position only in height.

In the fabrication method according to the present embodiment, the landing region C in which the discharged colored ink is landed is smaller than the landing region B in which the discharged base ink is landed. When the landing region C is smaller than the landing region B, a three-dimensional object can be produced with good printing accuracy in the colored region. In the present disclosure, the term "good printing accuracy in the colored region" refers to high visibility of an object (e.g., images or shapes) expressed by the colored region.

In the present disclosure, the term "visibility" refers to a property that the object is easily recognized or identified by light. The property is not limited to a property that the object is easily recognized by human vision, and includes a property that the object is easily identified by an optical device or the like. Even if the colored region is not identified by the optical device, the three-dimensional object having the colored region that is more recognizable than that produced by a comparative method is stated to have "good printing accuracy in the colored region."

Figure 2:
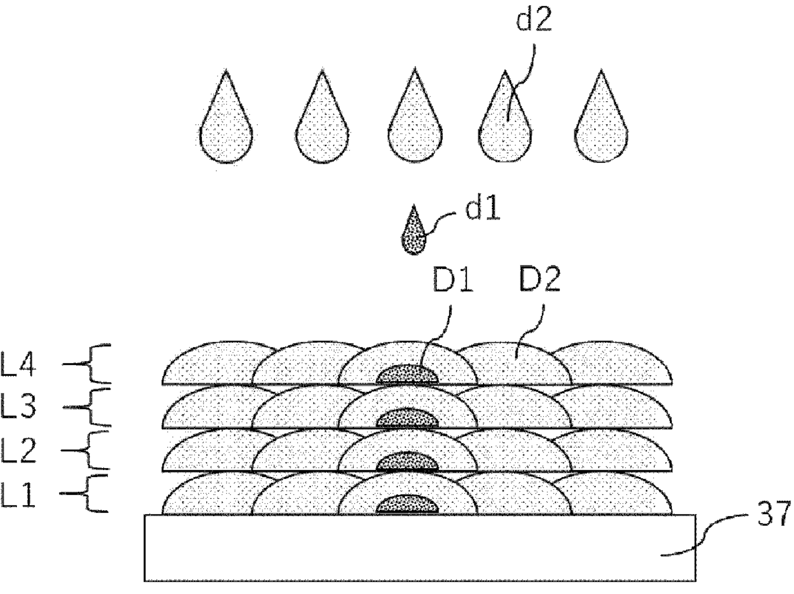
FIG. 2 is a schematic diagram illustrating a fabrication method of fabricating a colored three-dimensional object according to an embodiment of the present disclosure.

A description is given of the reason why a three-dimensional object having good printing accuracy in the colored region can be produced when the landing region C is smaller than the landing region B with reference to FIGS. 1 and 2. FIG. 1 is a schematic diagram illustrating a fabrication method of fabricating a colored three-dimensional object according to the comparative method. FIG. 2 is a schematic diagram illustrating a fabrication method of fabricating a colored three-dimensional object according to the present embodiment. When a three-dimensional object is produced by the material jetting, the three-dimensional object is formed in shape with height. Accordingly, the amount of ink discharged per unit area (in other words, the volume of a droplet of the discharged ink or a droplet volume) increases as compared to a two-dimensional image, which does not have height, formed by the inkjet method. As a result, when a colored three-dimensional object is produced with the colored ink and the base ink that are discharged in substantially the same amount according to the comparative method, the colored ink may bleed in the landing region C after being landed, and the region of bleeding is likely to be large, thereby reducing printing accuracy in the colored region.

For example, as illustrated in FIG. 1, a colored ink droplet d1 with a droplet volume C and a base ink droplet d2 with a droplet volume B are discharged onto an uppermost layer L4 of multiple layers L1 to L4 formed on a stage 37. Here, the droplet volume C is substantially the same as the droplet volume B. As a result, the landing region C indicated by a circular segment D1 in FIG. 1 and the landing region B indicated by a circular segment D2 in FIG. 1 are formed, which have substantially the same areas. At that time, a bleeding region E may be widely generated, thereby hindering the production of the three-dimensional object with good printing accuracy in the colored region.

On the other hand, when a colored three-dimensional object is produced by the fabrication method according to the present embodiment in which the landing region C is smaller than the landing region B, even if bleeding occurs in the landing region C formed of the landed colored ink, a bleeding region is small, thereby improving the printing accuracy in the colored region.

For example, as illustrated in FIG. 2, a colored ink droplet d1 with a droplet volume C and a base ink droplet d2 with a droplet volume B are discharged onto an uppermost layer L4 of multiple layers L1 to L4 formed on the stage 37. Here, the droplet volume C is smaller than the droplet volume B. As a result, the landing region C indicated by a circular segment D1 in FIG. 2 and the landing region B indicated by a circular segment D2 in FIG. 2 are formed. The landing region C has a smaller area than the landing region B. At that time, the bleeding region is less likely to occur at the edge of the landing region C, thereby producing a three-dimensional object with good printing accuracy in the colored region. As a result, for example, even when image data includes a fine shape such as a two-dimensional code in the colored region of a three-dimensional object, the three-dimensional object having the two-dimensional code can be produced with good reading accuracy because the printing accuracy in the colored region is good.

In the present disclosure, whether the landing region C is smaller than the landing region B is determined based on the areas thereof. Specifically, the area of the landing region C is defined as an area of the region in which the colored ink discharged for one voxel is landed in plan view in the direction in which the colored ink is discharged, the area of the landing region B is defined as an area of the region in which the base ink discharged for one voxel is landed in plan view in the direction in which the base ink is discharged, and whether or not the area of the landing region C is smaller than the area of the landing region B is determined. In the present disclosure, the "droplet volume" refers to a volume of the ink discharged for one voxel.

As described above, the area of the landing region C is smaller than the area of the landing region B. Specifically, the area of the landing region C is preferably 50% or less, more preferably 40% or less, and even more preferably 30% or less of the area of the landing region B. When the ratio of the area of the landing region C to the area of the landing region B is 50% or less, the printing accuracy in the colored region is further improved. The area of the landing region C is preferably 5% or more of the area of the landing region B.

As described above, the droplet volume C of the discharged colored ink is preferably smaller than the droplet volume B of the discharged base ink. Specifically, the droplet volume C of the colored ink is preferably 70% or less of the droplet volume B of the discharged base ink, more preferably 50% or less of the droplet volume B of the discharged base ink. When the ratio of the droplet volume C to the droplet volume B is 70% or less, the printing accuracy in the colored region is further improved. Further, the droplet volume C of the colored ink is preferably 10% or more of the droplet volume B of the discharged base ink.

Further, the fabrication method according to the present embodiment is preferably performed such that the landing region C and the landing region B overlap each other in each of the multiple layers. In other words, the colored region includes the landing region B together with the landing region C. Since the landing region C and the landing region B overlap each other in each of the multiple layers, the landing region B covers the entire region of the three-dimensional object. Thus, effects can be obtained that reinforce the three-dimensional object and improve the fabrication accuracy of the three-dimensional object as compared to when the landing region C and the landing region B do not overlap each other in each of the multiple layers (when the colored region is formed of only the landing region C smaller than the landing region B). When the colored region is large (for example, when the colored region is a solid image), if the landing region C and the landing region B do not overlap each other in the layer, the strength and the fabrication accuracy of the three-dimensional object are more likely to decrease. Accordingly, the effects obtained by the landing region B overlapped with the landing region C in the layer become more pronounced.

Further, the fabrication method according to the present embodiment is more preferably performed such that the landing region B is overlaid on the landing region C in each of the multiple layers. Since the landing region B is overlaid on the landing region C in the layer, even if the flattening step (roller processing or the like) described later is performed after the landing region B is formed, a flattening device (e.g., roller or the like) does not directly contact the landing region C. As a result, the flattening device does not spread the landing region C, thereby preventing the printing accuracy in the colored region from decreasing. For example, as illustrated in FIG. 2, the colored ink droplet d1 is discharged onto the uppermost layer L4 of the multiple layers L1 to L4 formed on the stage 37, and then the base ink droplet d2 is discharged onto the region of the colored ink droplet d1. As a result, the landing region B indicated by the circular segment D2 in FIG. 2 overlaps (is overlaid on) the landing region C indicated by the circular segment D1 in FIG. 2 in the layer.

Discharge Step C In the discharge step C, the colored ink that is active energy ray curable is discharged by the inkjet method. Specifically, the colored ink is discharged by the inkjet method onto the stage 37 that is movable up and down or the layer formed on the stage 37 to form the landing region C with the discharged colored ink. The landing regions C may be aggregated to form a liquid film.

Active Energy Ray Curable Colored Ink

The active energy ray curable colored ink includes a radical-polymerizable compound and a colorant. The colored ink may further include a polymerization initiator, a surfactant, a polymerization inhibitor, a dispersant, and other components, if desired.

Radical-Polymerizable Compound

The "radical-polymerizable compound" is polymerizable by radical polymerization to form a polymer, and is typically a monomer including one or more radical-polymerizable functional groups, which becomes a monomer unit in the polymer. Examples of the radical-polymerizable compound include a radical-polymerizable monomer such as a radical-polymerizable monofunctional monomer and a radical-polymerizable polyfunctional monomer, and a radical-polymerizable oligomer. Each of these materials can be used alone or in combination with others.

Each of the radical-polymerizable monofunctional monomer, the radical-polymerizable polyfunctional monomer, and the radical-polymerizable oligomer is radically polymerized by the active energy rays, thereby forming a cured product including a plurality of monomer units. That is, in the present disclosure, the "radical-polymerizable monomer" refers to a low-molecular compound including one or more radical-polymerizable functional groups, and the "radical-polymerizable oligomer" refers to a compound including monomer units and one or more radical-polymerizable functional groups. The term "oligomer" refers to a molecular compound including several structural units (i.e., the monomer units) derived from the monomer, and the number of the structural units may be different depending on the structure of the monomer, the use of the oligomer, and the like. Preferably, the number of the structural units is typically 2 or more and 20 or less.

The radical-polymerizable compound as the polymerizable compound prevents the viscosity of the colored ink from increasing and improves a polymerization rate as compared with a cationic-polymerizable compound. Therefore, the radical-polymerizable compound is suitable for the inkjet method.

The radical-polymerizable monomer as the radical-polymerizable compound further prevents the viscosity of the colored ink from increasing.

The radical-polymerizable monofunctional monomer as the radical-polymerizable compound still further prevents the viscosity of the colored ink from increasing.

The radical-polymerizable oligomer as the radical-polymerizable compound prevents a cured product from shrinking on curing and improve stretchability and toughness of the cured product.

Examples of the radical-polymerizable monofunctional monomer include acrylamide, N,N-dimethylacrylamide, N-isopropylacrylamide, acryloylmorpholine, hydroxyethylacrylamide, isobornyl (meth)acrylate, 2-ethylhexyl (meth) acrylate, 2-hydroxyethyl (meth)acrylate, 2-hydroxypropyl (meth)acrylate, caprolactone-modified tetrahydrofurfuryl (meth)acrylate, 3-methoxybutyl (meth)acrylate, tetrahydrofurfuryl (meth)acrylate, lauryl (meth)acrylate, 2-phenoxyethyl (meth)acrylate, isodecyl (meth)acrylate, isooctyl (meth)acrylate, tridecyl (meth)acrylate, caprolactone (meth) acrylate, and ethoxylated nonylphenol (meth)acrylate. Each of these materials can be used alone or in combination with others.

Examples of the radical-polymerizable polyfunctional monomer include a bifunctional monomer and a monomer including three or more functional groups. Each of these materials can be used alone or in combination with others.

Examples of the radical-polymerizable polyfunctional monomer having two functional groups include dipropylene glycol di(meth)acrylate, diethylene glycol di(meth)acrylate, tripropylene glycol di(meth)acrylate, triethylene glycol di(meth)acrylate, tetraethylene glycol di(meth)acrylate, polypropylene glycol di(meth)acrylate, neopentyl glycol hydroxypivalate di(meth)acrylate, hydroxypivalate neopentyl glycol di(meth)acrylate, 1,3-butanediol di(meth)acrylate, 1,4-butanediol di(meth)acrylate, 1,6-hexanediol di(meth) acrylate, 1,9-nonanediol di(meth)acrylate, diethylene glycol di(meth)acrylate, neopentyl glycol di(meth)acrylate, tripropylene glycol di(meth)acrylate, tricyclodecanedimethanol di(meth)acrylate, caprolactone-modified hydroxypivalate neopentyl glycol di(meth)acrylate, propoxylated neopentyl glycol di(meth)acrylate, ethoxy-modified bisphenol A di(meth)acrylate, polyethylene glycol 200 di(meth)acrylate, and polyethylene glycol 400 di(meth)acrylate. Each of these materials can be used alone or in combination with others.

Examples of the radical-polymerizable polyfunctional monomer having three or more functional groups include trimethylolpropane tri(meth)acrylate, pentaerythritol tri (meth)acrylate, dipentaerythritol hexa(meth)acrylate, triallyl isocyanurate, F-caprolactone-modified dipentaerythritol tri (meth)acrylate, F-caprolactone-modified dipentaerythritol tetra(meth)acrylate, (meth)acrylate, F-caprolactone-modified dipentaerythritol penta(meth)acrylate, F-caprolactone-modified dipentaerythritol hexa(meth)acrylate, tris(2-hydroxyethyl) isocyanurate tri(meth)acrylate, ethoxylated trimethylolpropane tri(meth)acrylate, propoxylated trimethylolpropane tri(meth)acrylate, propoxylated glyceryl tri (meth)acrylate, pentaerythritol tetra(meth)acrylate, ditrimethylolpropane tetra(meth)acrylate, dipentaerythritol hydroxypenta(meth)acrylate, ethoxylated pentaerythritol tetra(meth)acrylate, and penta(meth)acrylate. Each of these materials can be used alone or in combination with others.

The radical-polymerizable oligomer preferably includes, for example, monomers including 1 to 6 functional groups, and more preferably monomers including 2 or 3 functional groups. Each of these materials can be used alone or in combination with others.

The radical-polymerizable oligomer including a urethane group causes an interaction between side chains in the polymer, thereby improving the toughness of the cured product. The radical-polymerizable oligomer including the urethane group is preferably a urethane acrylate oligomer.

Commercially available products can be used as the radical-polymerizable oligomer, and examples thereof include UV-6630B (ultraviolet curable urethane acrylate oligomer, molecular weight: 3000, the number of polymerizable functional groups: 2, manufactured by Mitsubishi Chemical Corporation formerly known as The Nippon Synthetic Chemical Industry Co., Ltd.) and CN983NS (aliphatic urethane acrylate oligomer, the number of polymerizable functional groups: 2, manufactured by Sartomer). Each of these materials can be used alone or in combination with others.

Examples of the radical-polymerizable compound include an acrylic monomer, a methacrylic monomer, and a vinyl carboxylate monomer as described above, but the acrylic monomer is preferable. The acrylic monomer prevents the viscosity of the colored ink from increasing and improves the polymerization rate. Accordingly, the acrylic monomer can be suitably used in the inkjet method.

The radical-polymerizable monofunctional monomer other than the acrylic monomer or an epoxy monomer is preferably used in combination with the acrylic monomer. Examples of the epoxy monomer include bis (3,4-epoxycyclohexyl) and bisphenol A diglycidyl ether. The epoxy monomer is preferably used in combination with an oxetane monomer in addition to the acrylic monomer.

A proportion of the radical-polymerizable compound in the colored ink is preferably 50.0% by mass or more, more preferably 60.0% by mass or more, further preferably 70.0% by mass or more, and particularly preferably 80.0% by mass or more. In addition, the proportion of the radical-polymerizable compound is preferably 99.0% by mass or less, more preferably 95.0% by mass or less.

A proportion of the radical-polymerizable monofunctional monomer in the colored ink is preferably 30.0% by mass or more, more preferably 40.0% by mass or more. In addition, the proportion of the radical-polymerizable monofunctional monomer is preferably 99.0% by mass or less, more preferably 95.0% by mass or less.

A proportion of the radical-polymerizable polyfunctional monomer in the colored ink is preferably 10.0% by mass or more. In addition, the proportion of the radical-polymerizable polyfunctional monomer is preferably 40.0% by mass or less, more preferably 30.0% by mass or less.

A proportion of the radical-polymerizable oligomer in the colored ink is preferably 1.0% by mass or more, more preferably 10.0% by mass or more. In addition, the proportion of the radical-polymerizable oligomer is preferably 40.0% by mass or less, more preferably 30.0% by mass or less.

Colorant

The colored ink includes a colorant to form the above-described colored region.

The colorant is preferably a dye or a pigment that can be dissolved or stably dispersed in the colored ink. The pigment is more preferable in terms of durability and safety of the colored ink. In the present disclosure, the pigment is functionally distinguished from a hard solid component described later and does not include the hard solid component.

Usable pigments include both inorganic pigments and organic pigments. Each of the pigments may be used alone or two or more of the pigments may be used in combination. A mixed crystal may be used as the pigment.

Specific examples of the inorganic pigment include, but are not limited to, titanium oxide, iron oxide, calcium carbonate, barium sulfate, aluminum hydroxide, Barium Yellow, Cadmium Red, Chrome Yellow, and carbon black produced by a known method such as a contact method, a furnace method, and a thermal method.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye chelates and acid dye chelates), nitro pigments, nitroso pigments, and aniline black.

The volume average particle diameter of the pigment is preferably 10 nm or more and 1000 nm or less in terms of stable dispersion of the pigments and an image density in the colored region. The volume average particle diameter can be measured by a particle size analyzer (NANOTRAC WAVE-UT151 manufactured by MicrotracBEL Corp.).

Usable dyes include acid dyes, direct dyes, reactive dyes, and basic dyes. Each of the dyes may be used alone or two or more of the dyes may be used in combination.

A proportion of the colorant in the colored ink is preferably 0.1% by mass or more, more preferably 0.1% by mass or more and 10.0% by mass or less. When the proportion of the colorant is 0.1% by mass or more, the image density in the colored region can be sufficiently improved even by the fabrication method according to the present embodiment in which the discharge amount of the colored ink is smaller than that in a typical fabrication method.

Polymerization Initiator

Examples of the polymerization initiator include, but are not limited to, materials capable of generating radicals or cations by irradiation of the active energy rays such as light. Examples of the active energy rays include visible light, ultraviolet rays, infrared rays, X-rays, α-rays, β-rays, and γ-rays. The polymerization initiator can be used alone or in combination with others. A proportion of the polymerization initiator in the colored ink is preferably 0.1% by mass or more and 10.0% by mass or less, more preferably 1.0% by mass or more and 5.0% by mass or less.

Specific examples of the radical photopolymerization initiator include, but are not limited to, acetophenone, 2,2-diethoxyacetophenone, p-dimethylaminoacetophenone, benzophenone, 2-chlorobenzophenone, p,p'-dichlorobenzophenone, p,p'-bisdiethylaminobenzophenone, Michler's ketone, benzyl, benzoin, benzoin methyl ether, benzoin ethyl ether, benzoin isopropyl ether, benzoin n-propyl ether, benzoin isobutyl ether, benzoin n-butyl ether, benzyl methyl ketal, thioxanthone, 2-chlorothioxanthone, 2-hydroxy-2-methyl-1-phenyl-1-one, 1-(4-isopropylphenyl)-2-hydroxy-2-methylpropane-1-one, methyl benzoylformate, 1-hydroxycyclohexyl phenyl ketone, azobisisobutyronitrile, benzoyl peroxide, and di-tert-butyl peroxide. Each of these materials can be used alone or in combination with others. Examples of commercially available products for the cationic photopolymerization initiator include UVI-6950, UVI-6970, UVI-6974, and UVI-6990 manufactured by Union Carbide Corporation; ADEKA OPTOMER SP-150, SP-151, SP-170, and SP-172 manufactured by ADEKA Corporation; IRGACURE 261 manufactured by BASF SE, formerly known as Ciba Specialty Chemicals Co.; CI-2481, CI-2624, CI-2639, and CI-2064 manufactured by Nippon Soda Co., Ltd.; CD-1010, CD-1011, and CD-1012 manufactured by Sartomer, DTS-102, DTS-103, NAT-103, NDS-103, TPS-103, MDS-103, MPI-103, and BBI-103 manufactured by Midori Kagaku Co., Ltd.; and PCI-061T, PCI-062T, PCI-020T, and PCI-022T manufactured by Nippon Kayaku Co., Ltd. Each of these materials can be used alone or in combination with others.

Surfactant

The surfactant is preferably compounds having a molecular weight of 200 or more and 5000 or less, and specific examples thereof include polyethylene glycol (PEG)-type nonionic surfactants (e.g., 1 to 40 mol ethylene oxide (EO) adducts of nonylphenol and 1 to 40 mol EO adducts of stearic acid), polyol-based nonionic surfactants (e.g., sorbitan palmitate monoester, sorbitan stearate monoester, and sorbitan stearate triester), fluorine-containing surfactants (e.g., 1 to 50 mol EO adducts of perfluoroalkyl, perfluoroalkyl carboxylate, and perfluoroalkyl betaine), and modified silicone oils (e.g., polyether-modified silicone oil and (meth) acrylate-modified silicone oil). Each of these materials can be used alone or in combination with others.

Polymerization Inhibitor

Specific examples of the polymerization inhibitor include, but are not limited to, phenol compounds (e.g., hydroquinone, hydroquinone monomethyl ether, 2,6-di-tert-butyl-p-cresol, 2,2-methylene-bis-(4-methyl-6-tert-butylphenol), and 1,1,3-tris-(2-methyl-4-hydroxy-5-tert-butylphenyl)butane), sulfur compounds (e.g., dilauryl thiodipropionate), phosphor compounds (e.g., triphenyl phosphite), and amine compounds (e.g., phenothiazine). Each of these materials can be used alone or in combination with others.

Dispersant

The dispersant is an additive that is adsorbed on the surface of a solid component such as the pigment to stably disperse the solid component in the colored ink. As the dispersant, a known material can be appropriately used.

Other Components

Examples of other components include an organic solvent, water, and the hard solid component.

The colored ink may contain the organic solvent, but preferably does not contain the organic solvent. When the composition contains no organic solvent, in particular, when the composition is free of VOC (volatile organic compound), a higher degree of safety is provided at sites where the composition is being handled while environment pollution is prevented. Here, the organic solvent refers to a general non-reactive organic solvent, such as ether, ketone, xylene, ethyl acetate, cyclohexanone, and toluene, which should be distinguished from polymerizable compounds. When the composition is stated to contain no organic solvent, it means that the composition does not "substantially" contain an organic solvent (e.g., the property of the organic solvent contained in the composition does not affect the colored ink). In this case, the proportion of the organic solvent in the colored ink is preferably less than 0.1% by mass.

The colored ink may contain water, but preferably does not contain water. When the composition is stated to contain no water, it means that the composition does not "substantially" contain water (e.g., the property of water contained in the composition does not affect the colored ink). In this case, the proportion of water in the colored ink is preferably less than 1.0% by mass. When the proportion of water is less than a certain amount, the composition prevents a decrease in curing rate, a decrease in curing strength, an increase in water absorptivity, and a decrease in separability from the support portion formed of the support ink described below.

The colored ink may contain the hard solid component described later, but is preferably free of hard solid component. As described above, the colored ink preferably contains a pigment as a colorant which is the solid component. When the colored ink further contains the hard solid component as an additional solid component, the difficulty in prescribing and manufacturing the colored ink may increase to determine conditions for stably dispersing both the pigment and the hard solid component in the colored ink. When the composition is stated to be free of hard solid component, it means that the composition does not "substantially" contain the hard solid component (e.g., the property of the hard solid component contained in the composition does not affect the colored ink). In this case, the proportion of the hard solid component in the colored ink is preferably less than 0.1% by mass.

When the colored ink does not contain the hard solid component, the strength of the three-dimensional object formed of the colored ink may decrease in the colored region. In the fabrication method according to the present embodiment, as described above, the landing region C and the landing region B overlap each other in each of the multiple layers. Accordingly, the landing region B, which is formed of the base ink containing the hard solid component, covers the entire region of the three-dimensional object. Thus, the dispersion stability in the colored ink is improved and the strength of three-dimensional object in the colored region is prevented from decreasing.

Physical Properties of Colored Ink

The color ink preferably has a low viscosity in view of the discharge property from a nozzle of an inkjet head to be used by the inkjet method. In one embodiment, the viscosity of the colored ink according to the present embodiment is preferably 1000 mPa·s or less, more preferably 200 mPa·s or less, and even more preferably 150 mPa·s or less in an environment of 25° C. In addition, the viscosity of the colored ink is preferably 9 mPa·s or more in the environment of 25° C. in view of the discharge property and fabrication accuracy. During fabrication, the temperature of the inkjet head or an ink channel can be adjusted to adjust the viscosity of the colored ink.

The viscosity can be measured by conventional methods, for example, a method described in Japanese Industrial Standards (JIS) Z 8803. The viscosity can be measured with a cone-plate rotary viscometer (VISCOMETER TVE-22L manufactured by Toki Sangyo Co., Ltd.). For example, a cone rotor (1° 34'×R24) is used at a rotation speed of 50 revolutions per minute (rpm), and the temperature of the constant-temperature circulating water is set to from 20° C. to 65° C. to measure the viscosity. The temperature of the circulating water can be adjusted by an instrument VISCOMATE VM-150III.

The colored ink used by the inkjet method preferably has a surface tension of 20 to 40 mN/m in the environment of 25° C. in view of the discharge stability and fabrication accuracy. In one embodiment, the colored ink according to the present embodiment has a surface tension of 20 to 40 mN/m in the environment of 25° C.

The surface tension can be measured by conventional methods, and examples of the measurement method include a plate method, a ring method, and a pendant drop method.

Container for Colored Ink

The container of the colored ink refers to a container storing the colored ink. The container that stores the color ink can be used as an ink cartridge or an ink bottle. An operator does not directly touch the colored ink when transporting or replacing the colored ink, thereby preventing operator's fingers and clothes from being stained with the colored ink. In addition, the ink cartridge or the ink bottle prevents foreign substances from being mixed into the colored ink. The container is not limited in shape, size, and material. Preferably, the container is made of a light-blocking material that transmits no light, or the container is covered with a light-blocking sheet.

Cure Step C

In the cure step C, the discharged colored ink is irradiated with active energy rays to cure the colored ink. Specifically, the landing region C in which the discharged colored ink is landed is irradiated with active energy rays corresponding to the polymerization initiator contained in the colored ink.

As the active energy rays used for curing the colored ink, light is preferable, and ultraviolet rays having wavelengths of 220 to 400 nm are particularly preferable. The active energy rays are not particularly limited as long as the active energy rays can apply sufficient energy to proceed a polymerization reaction of the polymerizable compound in the composition of the ink. Examples of the active energy rays include electron beams, α-rays, β-rays, γ-rays, and X-rays in addition to ultraviolet rays. Particularly when a high-energy light source is used, the polymerization reaction can proceed without a polymerization initiator. In the case of ultraviolet rays, mercury-free light sources are strongly desired for environmental protection. Replacement with a GaN-based semiconductor ultraviolet irradiator is very useful both industrially and environmentally. In addition, ultraviolet light-emitting diodes (UV-LED) and ultraviolet laser diodes (UV-LD) are preferable as ultraviolet light sources because of a compact size, an extended lifetime, a high efficiency, and low-cost thereof.

Discharge Step B

In the discharge step B, the base ink that is active energy ray curable is discharged by the inkjet method. Specifically, the base ink is discharged by the inkjet method onto the stage 37 that is movable up and down, the layer formed on the stage 37, or the landing region C formed of the landed colored ink on the stage 37 to form the landing region B with the discharged base ink. The landing regions B may be aggregated to form a liquid film.

Active Energy Ray Curable Base Ink

The active energy ray curable base ink includes a radical-polymerizable compound and a hard solid component. The base ink may further include a polymerization initiator, a surfactant, a polymerization inhibitor, a dispersant, and other components, if desired.

Hereinafter, various components included in the base ink are described. The radical-polymerizable compound, the polymerization initiator, the surfactant, the polymerization inhibitor, and the dispersant in the above descriptions of the colored ink can also be used for the base ink, and thus descriptions thereof are omitted. The physical properties of the base ink are preferably the same as the physical properties of the colored ink, a container of the base ink is preferably the same as the container of the colored ink, and thus descriptions thereof are also omitted.

Hard Solid Component

The base ink contains the hard solid component in order to improve the modulus of elasticity, strength, impact resistance of the cured product of the base ink.

In the present disclosure, the term "hard" refers to a property with which the shape is not easily changed by external stress. A person skilled in the art can determine hard or not hard based on a determination reference known in the technical field, and examples of the determination reference include Vickers hardness and modulus of elasticity. In one embodiment, the modulus of elasticity of the hard solid component is preferably equal to or greater than 4 GPa, more preferably equal to or greater than 5 GPa. The modulus of elasticity can be measured in accordance with, for example, JIS K 7161, JIS K 7171, and International Organization for Standardization (ISO) 14577.

In the present disclosure, the term "solid component" refers to a component that maintains a solid state in a liquid such as ink. Preferably, the solid component is a particle in the liquid. More preferably, the solid components are dispersed in the liquid.

In the present disclosure, the hard solid component is functionally distinguished from the colorant described above. For example, the hard solid component does not include the pigment that is the colorant as the solid component.

Examples of the hard solid component include, but are not limited to, glass, silica, alumina, zirconia, wollastonite, potassium titanate, xonotlite, gypsum fiber, aluminum borate, aramid fiber, carbon fiber, glass fiber, talc, mica, glass flake, polyoxybenzoyl whisker, and various resins.

The hard solid component having a hydroxyl group on the surface thereof, such as glass, silica, or alumina, is preferably surface-modified with a silane coupling agent. The silane coupling agent is not particularly limited, and examples thereof include vinylmethoxysilane, vinylethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, tris-(trimethoxysilylpropyl)isocyanurate, 3-ureidopropyltrialkoxysilane, 3-mercaptopropylmethyldimethoxysilane, 3-mercaptopropyltrimethoxysilane, 3-isocyanatopropyltriethoxysilane, and 3-trimethoxysilylpropylsuccinic anhydride. Each of these materials can be used alone or in combination with others.

Among these materials, silane coupling agents having an unsaturated double bond such as vinylmethoxysilane, 3-methacryloxypropylmethyldimethoxysilane, and 3-acryloxypropyltrimethoxysilane are particularly preferable.

The proportion of the hard solid component in the base ink is preferably 0.5% by volume or more and 40.0% by volume or less, more preferably 1.0% by volume or more and 20.0% by volume or less. When the proportion of the hard solid component in the base ink is 0.5% by volume or more, the property of the hard solid component can be reflected in a three-dimensional object. When the proportion of the hard solid component in the base ink is 40.0% by volume or less, the three-dimensional object is prevented from becoming brittle.

The shape of the hard solid component is not particularly limited, and may be spherical, rod-shaped, or indefinite, and may be hollow particles, porous particles, core-shell particles, or the like.

The hard solid component preferably has a volume average particle diameter of from 10 to 1000 nm, more preferably from 120 to 300 nm.

When the volume average particle diameter of the hard solid component is 10 nm or more, the property of the hard solid component can be sufficiently reflected in a three-dimensional object. When the volume average particle diameter of the hard solid component is 1000 nm or less, the base ink is stably discharged by the inkjet method. In consideration of the dispersion stability of the hard solid components in the base ink, the volume average particle diameter of the hard solid component is more preferably 300 nm or less.

Other Components

Examples of other components include an organic solvent, water, and the colorant. Since the organic solvent and water are the same as those in the above description of the colored ink, descriptions thereof are omitted.

The base ink may contain the pigment which is the colorant as the solid component described above, but is preferably free of pigment. As described above, the base ink contains the hard solid component. When the base ink further contains the pigment as an additional solid component, the difficulty in prescribing and manufacturing the base ink may increase to determine conditions for stably dispersing both the pigment and the hard solid component in the base ink. When the composition is stated to be free of pigment, it means that the composition does not "substantially" contain a pigment (e.g., the property of pigment contained in the composition does not affect the color tone of the base ink). In this case, the proportion of the pigment in the base ink is preferably less than 0.1% by mass.

Cure Step B

In the cure step B, the discharged base ink is irradiated with active energy rays to cure the base ink. Specifically, the landing region B in which the discharged base ink is landed is irradiated with active energy rays corresponding to the polymerization initiator contained in the base ink. The active energy rays used for curing the base ink is the same as the active energy rays used for curing the color ink.

Discharge Step S

In the discharge step S, the support ink that is active energy ray curable is discharged by the inkjet method. Specifically, the support ink is discharged by the inkjet method onto the stage 37 that is movable up and down or the layer formed on the stage 37 to form the landing region S with the discharged support ink. The landing regions S may be aggregated to form a liquid film.

Preferably, the discharge step S and the above-described discharge step C are performed in the same scan, which is described later, and the discharge step B is performed in the subsequent scan after the discharge step C and the discharge step S. In general, the discharge of the ink for forming the model portion and the discharge of the ink for forming the support portion are preferably performed in different scans from the viewpoint of clearly forming the interface between the model portion and the support portion, and at least two scans are performed. On the other hand, in the fabrication method according to the present embodiment, since the colored ink and the base ink are used as the ink for forming the model portion, the number of types of ink to be used increases as compared with the general method. However, since the landing region C formed of the colored ink and the landing region S formed of the support ink rarely or does not directly contact each other to form the interface (for example, because the landing region B indicated by the circular segment D2 is overlaid on the landing region C indicated by the circular segment D1 as illustrated in FIG. 2), the discharge step C and the discharge step S can be performed in the same scan. Therefore, in the fabrication method according to the present embodiment, although the number of types of ink for forming the model portion increases as compared with the general method, the number of times of scans during fabrication does not change, thereby maintaining productivity of the three-dimensional object.

Active Energy Ray Curable Support Ink

The cured product of the active energy ray curable support ink is disintegrable when immersed in water or the like, and thus the support portion is easily removed from the model portion after fabrication.

A known material that is disintegrable can be suitably used as the support ink. For example, a support ink disclosed in PTL 2 can be used.

Curing Step S

In the cure step S, the discharged support ink is irradiated with active energy rays to cure the support ink. Specifically, the landing region S in which the discharged support ink is landed is irradiated with active energy rays corresponding to the polymerization initiator contained in the support ink. The active energy rays used for curing the support ink is the same as the active energy rays used for curing the color ink.

Three-Dimensional Fabrication Apparatus

A fabrication apparatus according to an embodiment of the present disclosure includes a discharge device C (an example of a first discharge device) to discharge a colored ink that is active energy ray curable by an inkjet method, a cure device C (an example of a first cure device) to irradiate the colored ink with active energy rays to cure the colored ink, a discharge device B (an example of a second discharge device) to discharge a base ink that is active energy ray curable by the inkjet method, and a cure device B (an example of a second cure device) to irradiate the base ink with the active energy rays to cure the base ink. The fabrication apparatus according to the present embodiment may include other devices if desired. For example, the fabrication apparatus further includes a discharge device S (an example of a third discharge device) to discharge a support ink that is active energy ray curable by the inkjet method, and a cure device S (an example of a third cure device) to irradiate the support ink with the active energy rays to cure the support ink. Droplets of the colored ink discharged by the discharge device C is landed in the landing region C, droplets of the base ink discharged by the discharge device B is landed in the landing region B, and droplets of the support ink discharged by the discharge device S is landed in the landing region S.

In addition, in the fabrication apparatus according to the present embodiment, the discharge device C and the cure device C repeatedly discharge and cure the colored ink, the discharge device B and the cure device B repeatedly discharge and cure the base ink, and if desired, the discharge device S and the cure device S repeatedly discharge and cure the support ink. As a result, multiple layers of the colored ink and the base ink are laminated to fabricate a colored three-dimensional object. The sequential repetition of the discharge by the discharge device C and the curing by the cure device C (hereinafter, also referred to as the "repeated steps C"), the sequential repetition of the discharge by the discharge device B and the curing by the cure device B (hereinafter, also referred to as the "repeated steps B"), and the sequential repetition of the discharge by the discharge device S and the curing by the cure device S (hereinafter, also referred to as the "repeated steps S") may be performed by independent devices, but the same device may serves as some devices (for example, the cure device C, the cure device B, and the cure device S) used in the repeated steps C, the repeated steps B, and the repeated steps S.

Figure 3:
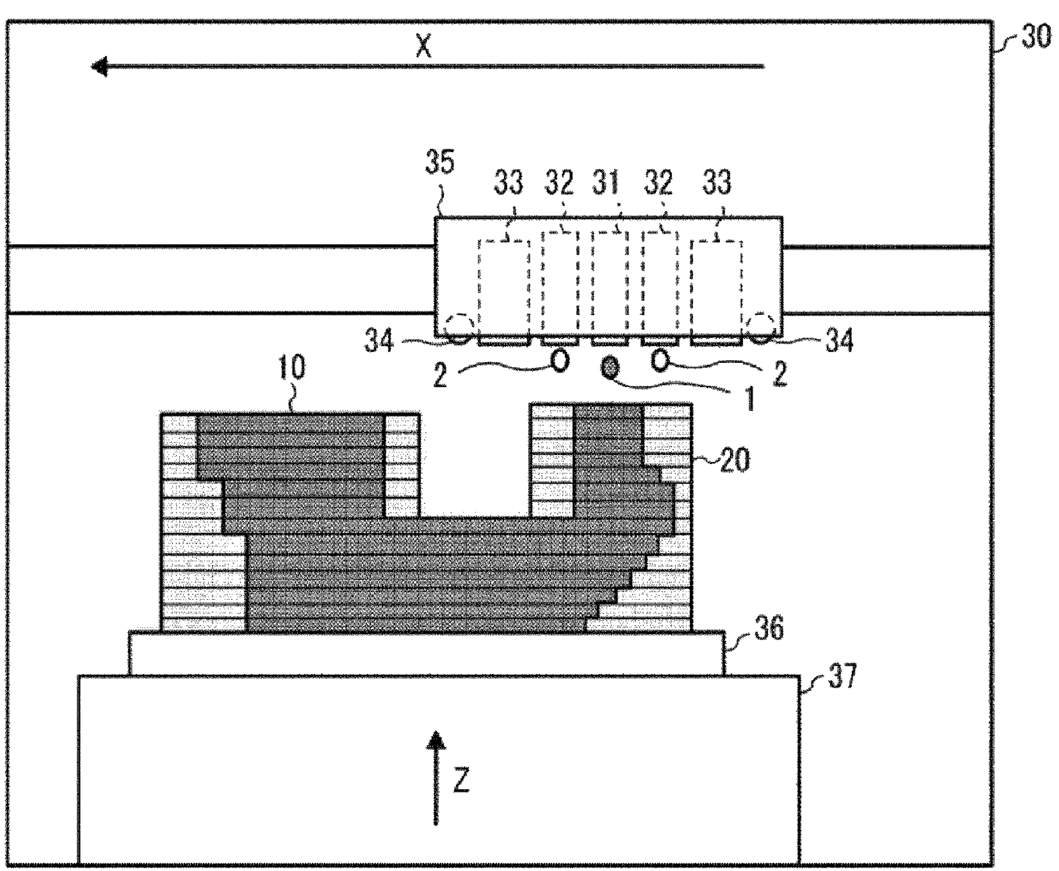
FIG. 3 is a schematic view of a fabrication apparatus according to an embodiment of the present disclosure.

An example of the fabrication apparatus is described below in detail with reference to FIG. 3 FIG. 3 is a schematic view of a fabrication apparatus 30 according to an embodiment of the present disclosure. The fabrication apparatus 30 includes head units 31 and 32 as discharge devices, ultraviolet irradiators 33 as cure devices, rollers 34, a carriage 35, and the stage 37. The head unit 31 independently discharges the color ink and the base ink. Note that the discharged droplet of the color ink or the base ink is indicated by a reference numeral 1 in FIG. 3. That is, the head unit 31 serves as both the discharge device C and the discharge device B described above. The head unit 32 discharges droplets 2 of the support ink. That is, the head unit 32 serves as the discharge device S described above. The ultraviolet irradiator 33 irradiates the discharged colored ink, base ink, and support ink with ultraviolet rays to cure the colored ink, the base ink, and the support ink. That is, the ultraviolet irradiator 33 serves as the cure device C, the cure device B, and the cure device S described above. The roller 34 smooths and flattens the liquid film of the colored ink, the base ink, and the support ink. The carriage 35 reciprocates the devices such as the head units 31 and 32 in the X direction indicated by arrow X in FIG. 1. The stage 37 moves a substrate 36 in the Z direction indicated by arrow Z in FIG. 1 and in the Y direction perpendicular to the surface of the paper in which FIG. 1 is drawn. Alternatively, the carriage 35 may be moved in the Y direction instead of the stage 37.

When multiple types of color inks are used corresponding to the number of colors, the head unit 31 independently discharges each of the multiple types of color inks. The head units 31 and 32 can suitably use any nozzle for a known inkjet printer.

Examples of metals used for the roller 34 include steel use stainless (SUS) 300s grades, 400s grades, 600s grades, hexavalent chromium, silicon nitride, and tungsten carbide. Each of these metals may be coated with fluorine, silicone, or the like to be used for the roller 34. Among these metals, SUS600s grades are preferable in view of strength and workability. When the roller 34 is used, the fabrication apparatus 30 lowers the stage 37 to keep the gap between the roller 34 and an upper surface of the fabricated object constant, laminates a layer on the upper surface, and repeats such operations multiple times corresponding the number of layers to be fabricated. Preferably, the roller 34 is disposed adjacent to the ultraviolet irradiator 33.

The fabrication apparatus 30 may include a cap that covers the nozzles in the head units 31 and 32 to prevent the ink from drying during standby, suspension, or power-off. The fabrication apparatus 30 may further includes a maintenance mechanism that maintains the head units 31 and 32 to prevent the nozzles from being clogged during continuous use for a long time.

Next, steps performed by the fabrication apparatus 30 are described.

The fabrication apparatus 30 includes an engine (in other words, a controller) that causes the head unit 31 to discharge droplets of the color ink while moving the carriage 35 or the stage 37 (i.e., in a scan of the carriage 35 or the stage 37) based on two-dimensional data and causes the head unit 32 to discharge droplets of the support ink in the same scan in which the droplets of the color ink are discharged. The two-dimensional data indicates one layer corresponding to the cross-section of the three-dimensional object to be fabricated, for example, first two-dimensional data indicates a lowest layer (first layer) at a first height, which is closest to the bottom surface of the three-dimensional object, among the group of two-dimensional data input to the engine. Thereafter, the engine of the fabrication apparatus 30 causes the head unit 31 to discharge droplets of the base ink in a subsequent scan after the scan in which the droplets of the colored ink and the droplets of the support ink are discharged. As a result, the droplets of the colored ink and the base ink are arranged at positions corresponding to the pixels indicating the model portion, the droplets of the support ink are arranged at positions corresponding to the pixels indicating the support portion based on the first two-dimensional data for the lowest layer, and a liquid film in which the droplets at adjacent positions are in contact with each other is formed.

The head units 31 and 32 preferably includes a heater. Further, preheaters are preferably installed in a supply path for independently supplying the colored ink and the base ink to the head unit 31 and in a supply path for supplying the support ink to the head unit 32.

In the flattening step, the roller 34 as an example of the flattening device scrapes off a surplus of the colored ink, the base ink, and the support ink discharged onto the stage 37 to flatten the surface of the colored ink, the base ink, and the support ink, thereby forming the layer of inks. The flattening step may be performed each time the layer of the colored ink, the base ink, and the support ink is laminated at one height in the Z direction, or may be performed once every time 2 to 50 layers are laminated. In the flattening step, the roller 34 may be stopped or may be rotated at a positive or negative relative speed with respect to the moving direction of the head units 31 and 32 (carriage 35). Further, the roller 34 may be rotated at a constant speed, constant acceleration, or constant deceleration. The relative rotation speed of the roller 34 with respect to the stage 37 is preferably 50 mm/s or more and 400 mm/s or less in absolute value. The relative speed that is too low may cause insufficient flatness. The relative speed that is too high may cause the apparatus to being upsized, or the discharged liquid droplets is likely to deviate from the desired position due to vibration of the roller 34. As a result, the flatness of the surface of the inks may decrease. In the flattening step, the rotation direction of the roller 34 is preferably opposite to the moving direction of the head units 31 and 32.

In the cure step, the engine of the fabrication apparatus 30 causes the ultraviolet irradiator 33 to emit ultraviolet rays corresponding to an absorption wavelength of the photopolymerization initiator contained in the colored ink, the base ink, and the support ink while moving the ultraviolet irradiator 33 with the carriage 35. Thus, the fabrication apparatus 30 cures the liquid film of the colored ink, the base ink, and the support ink to form the layer of ink.

After forming the lowest layer, the engine of the fabrication apparatus 30 lowers the stage 37 by a distance corresponding to one layer.

The engine of the fabrication apparatus 30 causes the head unit 31 to discharge droplets of the color ink while moving the carriage 35 or the stage 37 (i.e., in a scan at a second height) based on second two-dimensional data from the bottom and causes the head unit 32 to discharge droplets of the support ink in the same scan in which the droplets of the color ink are discharged. The second two-dimensional data indicates a second layer to be formed on the lowest layer, which corresponds to the second cross-section of the three-dimensional object to be fabricated. Thereafter, the engine of the fabrication apparatus 30 causes the head unit 31 to discharge droplets of the base ink in a subsequent scan after the scan in which the droplets of the colored ink and the droplets of the support ink are discharged. As a result, a liquid film having a cross-section indicated by the second two-dimensional data is formed on the lowest layer. Then, the engine of the fabrication apparatus 30 causes the carriage 35 to move the ultraviolet irradiator 33 and causes the ultraviolet irradiator 33 to irradiate the liquid film with ultraviolet rays to cure the liquid film, thereby forming the second layer on the lowest layer. The engine of the fabrication apparatus 30 uses the two-dimensional data in order from bottom to top, and repeats forming of a liquid film and curing of the liquid film in the same manner as described above, thereby laminating multiple layers. The number of repetitions varies depending on the number of two-dimensional data or the height, shape, and the like of the three-dimensional model. Thus, the layers corresponding to all the two-dimensional data are fabricated, thereby obtaining a fabricated object in which the model portion is supported by the support portion.

The fabricated object fabricated by the fabrication apparatus 30 includes the model portion and the support portion. The support portion is removed from the fabricated object after fabrication. Examples of a method of removing the support portion include physical removal and chemical removal. In the physical removal, a mechanical force is applied to the fabricated object to remove the support portion. In the chemical removal, the fabricated object is immersed in a solvent so that the support portion is disintegrated to remove the support portion. The method of removing the support portion is not particularly limited, but the chemical removal is more preferable because the physical removal may damage the model portion of the fabricated object. In consideration of cost, water is preferable as the solvent in which the fabricated object is immersed to remove the support portion. When the chemical removal using water is adopted, the support ink is selected that is disintegrable by water after being cured.

Three-Dimensional Object

The mechanical properties of the three-dimensional object fabricated by the fabrication method according to the present embodiment are not particularly limited, but, for example, the three-dimensional object preferably has the strength, stretchability, heat resistance, or impact resistance described below. Examples of a method for forming a three-dimensional object having the following strength, stretchability, heat resistance, or impact resistance include a method using a base ink containing the above-described hard solid component. In the mechanical properties of the three-dimensional object, regarding the strength, the maximum tensile stress is preferably 10 MPa or more, more preferably 30 MPa or more.

Regarding the stretchability, the tensile elongation at break is preferably 3% or more, more preferably 8% or more.

Regarding the heat resistance, the heat distortion temperature (HDT) is preferably 50° C. or more.

Regarding the impact resistance, the Izod impact strength is preferably 20 J/m or more, more preferably 40 J/m or more.

EXAMPLES

The examples of the present disclosure are described below, but the present disclosure is not limited to these examples.

Preparation of Base Ink

First, 65 parts by mass of isobornyl acrylate (manufactured by OSAKA ORGANIC CHEMICAL INDUSTRY LTD.), 24 parts by mass of bifunctional acrylate (trade name: A-600, manufactured by SHIN-NAKAMURA CHEMICAL Co., Ltd.), and 11 parts by mass of urethane acrylate oligomer (trade name: SHIKOH UV-6630B, manufactured by Mitsubishi Chemical Corporation formerly known as The Nippon Synthetic Chemical Industry Co., Ltd.) are mixed uniformly. Next, 4 parts by mass of diphenyl (2,4,6-trimethylbenzoyl)phosphineoxide (trade name: OMNIRAD TPO, manufactured by IGM Resins B.V.) as the photopolymerization initiator is added to the above mixture and mixed uniformly. Further, 10 parts by mass of the hard solid component (ADMAFINE K180SM-C5, manufactured by Admatechs Company Limited) is added to the above mixture and mixed uniformly. Lastly, the mixture is passed through a filter (trade name: CCP—FX-C1B, available from ADVANTEC TOYO KAISHA, LTD., average pore diameter: 3 μm) to obtain the base ink.

Preparation of Colored Ink

First, 65 parts by mass of isobornyl acrylate (manufactured by OSAKA ORGANIC CHEMICAL INDUSTRY LTD.), 24 parts by mass of bifunctional acrylate (trade name: A-600, manufactured by SHIN-NAKAMURA CHEMICAL Co., Ltd.), and 11 parts by mass of urethane acrylate oligomer (trade name: SHIKOH UV-6630B, manufactured by Mitsubishi Chemical Corporation formerly known as The Nippon Synthetic Chemical Industry Co., Ltd.) are mixed uniformly. Next, 4 parts by mass of diphenyl (2,4,6-trimethylbenzoyl)phosphineoxide (trade name: OMNIRAD TPO, manufactured by IGM Resins B.V.) as the photopolymerization initiator is added to the above mixture and mixed uniformly. Next, carbon black (trade name: MHI Black #220, manufactured by Mikuni-Color Ltd.) is added to the above mixture so that the proportion thereof in the total amount of the colored ink is 1.0% by mass, and mixed uniformly. Lastly, the mixture is passed through a filter (trade name: CCP—FX-C1B, available from ADVANTEC TOYO KAISHA, LTD., average pore diameter: 3 μm) to obtain the colored ink.

Preparation of Support Ink

To obtain the support ink, 30 parts by mass of acryloylmorpholine (manufactured by KJ Chemicals Corporation), 20 parts by mass of 1,5-pentanediol (manufactured by Tokyo Chemical Industry Co., Ltd.), 2 parts by mass of polypropylene glycol (trade name: ACTCOL D-1000, manufactured by Mitsui Chemicals, Inc., number average molecular weight: 1,000), and 2 parts by mass of bis(2,4,6-trimethylbenzoyl)-phenylphosphine oxide (trade name: IRGACURE 819, manufactured by BASF SE) are stirred and mixed.

Colored Three-Dimensional Object

Example 1

In the fabrication apparatus 30 for fabricating a three-dimensional object illustrated in FIG. 3, three tanks communicating with an inkjet head (i.e., the head units 31 and 32, e.g., trade name: MH2820, manufactured by Ricoh Industry Company, Ltd.) were filled with the base ink, the colored ink, and the support ink obtained as described above, respectively. Next, the shape of the model portion to be fabricated was set to the length of 10 mm in the X direction, the length of 10 mm in the Y direction, and the height of 2 mm in the Z direction. The colored region was set in the range of the height from 1 to 1.2 mm (i.e., the thickness is 0.2 mm) in the model portion. The colored region includes thin lines that depict a two-dimensional code as observed on the XY plane. The support portion was set around the model portion. The inkjet head discharged the base ink, the colored ink, and the support ink under predetermined conditions (¼ interlace, scanning speed: 150 mm/s, discharge frequency: 3500 kHz, 600×600 dpi), and then the roller 34 flattened the surfaces of the inks. Specifically, the inkjet head discharged the colored ink and the support ink in the first scan, and discharged the base ink in the subsequent scan (second scan) to fabricate one layer having the colored region. At this time, the base ink was discharged so that the landing region B was overlaid on the landing region C in the one layer. The droplet volume C of the discharged colored ink was 20 pL, and the droplet volume B of the discharged base ink was 45 pL. The landing region C had a substantially circular shape with a diameter of 0.10 mm, and the landing region B had a substantially circular shape with a diameter of 0.20 mm (i.e., the landing region C was smaller than the landing region B).

The ultraviolet irradiator (e.g., apparatus name: SPOT CURE SP5-250DB manufactured by Ushio Inc.) irradiates the base ink, the colored ink, and the support ink with ultraviolet rays having a light amount of 350 mJ/cm$^2$. Thereafter, the series of steps described above were repeated to form the multiple layers.

Figure 4:
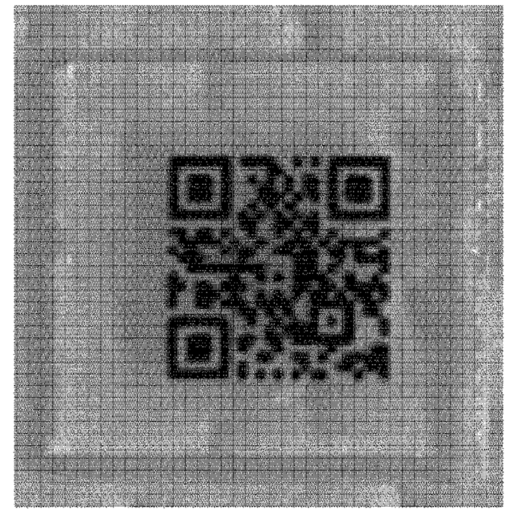
FIG. 4 is a picture of a three-dimensional object having a two-dimensional code fabricated in Example 1.

Next, the obtained fabricated object was put into 1 L of water at 40° C. and subjected to ultrasonic vibration for 1 hour to remove the support portion from the fabricated object, resulting in the model portion remaining in the water. Thereafter, the model portion was taken out from the water and dried at room temperature (25° C.) for 24 hours to obtain a three-dimensional object having a two-dimensional code (see FIG. 4).

In addition, the colored region was set in the range of the height from 1 to 1.2 mm (i.e., the thickness is 0.2 mm) in the model portion and changed to a solid image having dimensions 5 mm×5 mm as observed on the XY plane. A three-dimensional object having the solid image was obtained under the same other conditions described above.

Example 2

The base ink was discharged so that the landing region B did not overlap the landing region C in the layer, which is different from Example 1. A three-dimensional object having a two-dimensional code and a three-dimensional object having a solid image were obtained in the same other conditions described in Example 1.

Example 3

The colored ink having the droplet volume C of 30 pL was discharged, which is different from Example 1. A three-dimensional object having a two-dimensional code and a three-dimensional object having a solid image were obtained under the same other conditions described in Example 1.

As a result of changing the droplet volume C of the discharged color ink to 30 pL, the landing region C had a substantially circular shape with a diameter of 0.13 mm (the landing region C was smaller than the landing region B).

Example 4

The colored ink having the droplet volume C of 30 pL was discharged, which is different from Example 2. A three-dimensional object having a two-dimensional code and a three-dimensional object having a solid image were obtained under the same other conditions described in Example 2.

As a result of changing the droplet volume C of the discharged color ink to 30 pL, the landing region C had a substantially circular shape with a diameter of 0.13 mm (the landing region C was smaller than the landing region B).

Comparative Example 1

The colored ink having the droplet volume C of 45 pL was discharged, which is different from Example 1. An amount of ink in the colored region was excessive, and the roller 34 collided with the cured product of the ink in the colored region in the flattening step. As a result, a three-dimensional object having a two-dimensional code and a three-dimensional object having a solid image were not obtained under the same other conditions described in Example 1.

As a result of changing the droplet volume C of the discharged color ink to 45 pL, the landing region C had a substantially circular shape with a diameter of 0.20 mm (the landing region C had the same size as the landing region B).

Comparative Example 2

The base ink was discharged so that the landing region B did not overlap the landing region C in the layer, which is different from Comparative Example 1. A three-dimensional object having a two-dimensional code and a three-dimensional object having a solid image were obtained in the same other conditions described in Comparative Example 1.

Comparative Example 3

Figure 5:
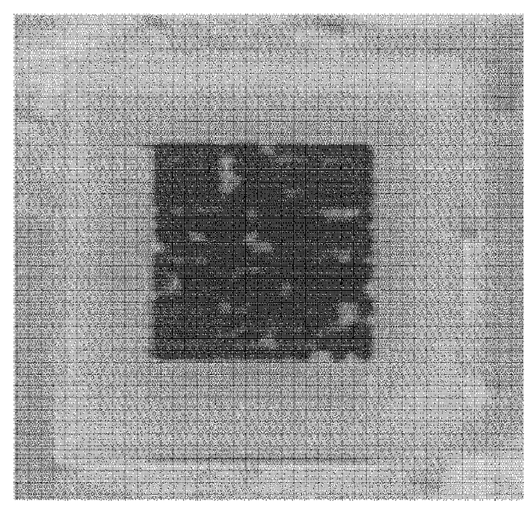
FIG. 5 is a picture of a three-dimensional object having a two-dimensional code fabricated in Comparative Example 3.

The base ink having the droplet volume B of 25 pL was discharged and the colored ink having the droplet volume C of 25 pL was discharged, which is different from Example 1. A three-dimensional object having a two-dimensional code (see FIG. 5) and a three-dimensional object having a solid image were obtained under the same other conditions described in Example 1.

As a result of changing the droplet volume B of the discharged base ink to 25 pL, the landing region B had a substantially circular shape with a diameter of 0.12 mm. In addition, as a result of changing the droplet volume C of the discharged color ink to 25 pL, the landing region C had a substantially circular shape with a diameter of 0.12 mm (the landing region C had the same size as the landing region B).

Comparative Example 4

The base ink was discharged so that the landing region B did not overlap the landing region C in the layer, which is different from Comparative Example 3. A three-dimensional object having a two-dimensional code and a three-dimensional object having a solid image were obtained in the same other conditions described in Comparative Example 3.

The three-dimensional objects having the two-dimensional code obtained in the above examples and the comparative examples were evaluated in terms of the printing accuracy of the colored region, the fabrication accuracy of the three-dimensional object, and the strength of the three-dimensional object according to the following methods. The results are illustrated in Table 1.

In addition, the three-dimensional objects having the solid image obtained in the above examples and the comparative examples were evaluated in terms of the fabrication accuracy of the three-dimensional object and the strength of the three-dimensional object according to the following methods. The results are illustrated in Table 1.

Evaluation of Printing Accuracy of Colored Region

In the colored region of the three-dimensional object having the two-dimensional code, the presence or absence and the degree of bleeding were visually observed. Further, the possibility of reading the two-dimensional code was tested using a two-dimensional code reader, and evaluation was performed based on the following evaluation criteria.

Evaluation Criteria

A: The two-dimensional code does not bleed and is readable by the two-dimensional code reader.

B: The two-dimensional code slightly bleeds and is not readable by the two-dimensional code reader.

C: The two-dimensional code largely bleeds and is not readable by the two-dimensional code reader.

Evaluation of Fabrication Accuracy of Three-Dimensional Object

The three-dimensional object having the two-dimensional code and the three-dimensional object having the solid image were visually observed and evaluated based on the following evaluation criteria.

Evaluation Criteria

A: Distortion such as a recess is not observed on the top surface of the three-dimensional object.

B: A recess is slightly observed on the colored region on the top surface of the three-dimensional object.

C: A recess is clearly observed on the colored region on the top surface of the three-dimensional object.

Evaluation of Strength of Three-Dimensional Object

The ratios of the strengths of the three-dimensional object having the two-dimensional code and the three-dimensional object having the solid image to the strength of the three-dimensional object fabricated only with the base ink were calculated and evaluated based on the following evaluation criteria. The strength of the three-dimensional object was measured by a precision universal tester (e.g., AUTOGRAPH AG-X manufactured by SHIMADZU CORPORATION). The tensile test on samples was performed under conditions of a tensile speed of 5 mm/min and a distance between tensile jigs of 50 mm. The maximum value of stresses from the test start to the break of the sample is defined as a measured value of the strength.

Evaluation Criteria

A: The ratio of strength is 90% or more.

B: The ratio of strength is 70% or more and less than 90%.

C: The ratio of strength is less than 70%.

32 Head unit (an example of a liquid discharge head)
33 Ultraviolet irradiator
34 Roller
35 Carriage
36 Substrate
37 Stage

The invention claimed is:

1. A fabrication method, comprising:

discharging, by an inkjet method, a droplet of colored ink to land in a first landing region;

irradiating the colored ink with active energy rays to cure the colored ink;

discharging, by the inkjet method, a droplet of base ink to land in a second landing region larger than the first landing region;

irradiating the base ink with the active energy rays to cure the base ink; and repeating the discharging the colored ink and the irradiating the colored ink, and repeating the discharging the base ink and the irradiating the base ink, to laminate multiple layers of the colored ink and the base ink to fabricate a colored three-dimensional object having a colored region, wherein in each layer of the colored region, the second landing region including the droplet of base ink overlaps an entire area of the first landing region including the droplet of colored ink.

2. The fabrication method according to claim 1, wherein the second landing region is overlaid on the first landing region in each of the multiple layers.

TABLE 1

| | | | Example | | | | Comparative Example | | | |
|---|---|---|---|---|---|---|---|---|---|---|
| | | | 1 | 2 | 3 | 4 | 1 | 2 | 3 | 4 |
| Fabrication Condition | Droplet Volume of colored ink (pL) | | 20 | 20 | 30 | 30 | 45 | 45 | 25 | 25 |
| | Droplet Volume of base ink(pL) | | 45 | 45 | 45 | 45 | 45 | 45 | 25 | 25 |
| | Dismeter of Landing Region C (mm) | | 0.10 | 0.10 | 0.13 | 0.13 | 0.20 | 0.20 | 0.12 | 0.12 |
| | Diameter of Landing Region B (mm) | | 0.20 | 0.20 | 0.20 | 0.20 | 0.20 | 0.20 | 0.12 | 0.12 |
| | Positions of Landing Regions C and B | | Overlap | Not Overlap | Overlap | Not Overlap | Overlap | Not Overlap | Overlap | Not Overlap |
| Evaluation Result | Two-dimensional Code | Printing Accuracy | A | A | B | B | Not fabricated | C | C | C |
| | | Fabrication Accuracy | A | A | A | A | | A | A | C |
| | | Strength of Object | A | A | B | B | | C | C | C |
| | Solid image | Fabrication Accuracy | A | B | A | C | | C | A | C |
| | | Strength of Object | A | C | A | C | | C | C | C |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention Any one of the above-described operations may be performed in various other ways, for example, in an order different from the one described above.

REFERENCE SIGNS LIST

1 Droplet of the colored ink or the base ink
2 Droplet of the support ink
10 Model portion
20 Support portion
30 Fabrication apparatus
31 Head unit (an example of a liquid discharge head)

3. The fabrication method according to claim 1, wherein a volume of the droplet of the colored ink is smaller than a volume of the droplet of the base ink.

4. The fabrication method according to claim 1, wherein a volume of the droplet of the colored ink is 70% or less of a volume of the droplet of the base ink.

5. The fabrication method according to claim 1, wherein a volume of the droplet of the colored ink is 50% or less of a volume of the droplet of the base ink.

6. The fabrication method according to claim 1, wherein the base ink includes a hard solid component having a volume average particle diameter of 10 nm or more and 1000 nm or less.

7. The fabrication method according to claim 1, further comprising:

discharging, by the inkjet method, a support ink; and irradiating the support ink with the active energy rays to cure the support ink, wherein the discharging the colored ink and the discharging the support ink are performed in a same scan, and the discharging the base ink is performed in a scan subsequent to the same scan.

8. The fabrication method according to claim 1, wherein the colored ink includes a pigment having a volume average particle diameter of 10 nm or more and 1000 nm or less, and a proportion of the pigment in the colored ink is 0.1% by mass or more.

9. The fabrication method according to claim 1, wherein the colored ink is free of any hard solid component, and the base ink includes a hard solid component.

10. The fabrication method according to claim 1, wherein the colored ink includes a pigment, and the base ink is free of any pigment.

11. A fabrication apparatus, comprising:

a first discharger to discharge, by an inkjet method, a droplet of colored ink to land in a first landing region;

a first irradiator to irradiate the colored ink with active energy rays to cure the colored ink;

a second discharger to discharge, by the inkjet method, a droplet of base ink to land in a second landing region larger than the first landing region; and a second irradiator to irradiate the base ink with the active energy rays to cure the base ink, wherein the first discharger and the first irradiator repeatedly discharge and cure the colored ink, and the second discharger and the second irradiator repeatedly discharge and cure the base ink, to laminate multiple layers of the colored ink and the base ink to fabricate a colored three-dimensional object having a colored region, and in each layer of the colored region, the second landing region including the droplet of base ink overlaps an entire area of the first landing region including the droplet of colored ink.

12. The fabrication apparatus according to claim 11, wherein the first landing region and the second landing region overlap each other in each of the multiple layers.

13. The fabrication apparatus according to claim 11, wherein the second landing region is overlaid on the first landing region in each of the multiple layers.

14. The fabrication apparatus according to claim 11, wherein a volume of the droplet of the colored ink is smaller than a volume of the droplet of the base ink.

15. The fabrication apparatus according to claim 11, wherein a volume of the droplet of the colored ink is 70% or less of a volume of the droplet of the base ink.

16. The fabrication apparatus according to claim 11, wherein a volume of the droplet of the colored ink is 50% or less of a volume of the droplet of the base ink.

17. The fabrication apparatus according to claim 11, wherein the base ink includes a hard solid component having a volume average particle diameter of 10 nm or more and 1000 nm or less.

18. The fabrication apparatus according to claim 11, wherein the colored ink includes a pigment having a volume average particle diameter of 10 nm or more and 1000 nm or less, and a proportion of the pigment in the colored ink is 0.1% by mass or more.

19. The fabrication apparatus according to claim 11, wherein the colored ink is free of any hard solid component, and the base ink includes a hard solid component.

* * * * *